(12) United States Patent
Ann et al.

(10) Patent No.: US 12,367,708 B2
(45) Date of Patent: Jul. 22, 2025

(54) VEHICLE AND METHOD OF CONTROLLING THE SAME

(71) Applicants: Hyundai Motor Company, Seoul (KR); Kia Corporation, Seoul (KR)

(72) Inventors: Yun Sup Ann, Hwaseong-si (KR); Hyunsang Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 354 days.

(21) Appl. No.: 17/860,459

(22) Filed: Jul. 8, 2022

(65) Prior Publication Data
US 2023/0177877 A1   Jun. 8, 2023

(30) Foreign Application Priority Data
Dec. 6, 2021   (KR) .................. 10-2021-0172870

(51) Int. Cl.
| | | |
|---|---|---|
| B60R 25/24 | (2013.01) | |
| B60R 25/25 | (2013.01) | |
| B60R 25/30 | (2013.01) | |
| G06V 10/74 | (2022.01) | |
| G06V 40/16 | (2022.01) | |
| G01J 1/42 | (2006.01) | |

(52) U.S. Cl.
CPC ............ *G06V 40/172* (2022.01); *B60R 25/24* (2013.01); *B60R 25/25* (2013.01); *B60R 25/305* (2013.01); *G06V 10/761* (2022.01); *G01J 1/4204* (2013.01)

(58) Field of Classification Search
CPC .. G06V 40/172; G06V 10/761; G06V 40/173; G06V 20/59; G06V 40/166; G06V 40/171; B60R 25/24; B60R 25/25; B60R 25/305; B60R 25/10; G01J 1/4204
See application file for complete search history.

(56) References Cited

U.S. PATENT DOCUMENTS

| | | | |
|---|---|---|---|
| 10,503,990 B2 * | 12/2019 | Gleeson-May | ...... G06V 20/597 |
| 2019/0340423 A1 * | 11/2019 | Kim | ...... G06V 40/165 |
| 2019/0373468 A1 * | 12/2019 | Amisano | ...... H04W 12/062 |
| 2021/0248389 A1 * | 8/2021 | Liu | ...... H04N 7/188 |

FOREIGN PATENT DOCUMENTS

| | | | | |
|---|---|---|---|---|
| JP | 2020093566 A | * | 6/2020 | |
| JP | 7427463 B2 | * | 2/2024 | ........... B60R 25/245 |

OTHER PUBLICATIONS

A. P. Sreedevi and B. S. S. Nair, "Image Processing Based Real Time Vehicle Theft Detection and Prevention System," 2011 International Conference on Process Automation, Control and Computing, Coimbatore, India, 2011, pp. 1-6, doi: 10.1109/PACC.2011.5979056. (Year: 2011).*

* cited by examiner

*Primary Examiner* — Siamak Harandi
(74) *Attorney, Agent, or Firm* — SLATER MATSIL, LLP

(57) ABSTRACT

An embodiment vehicle includes a camera and a controller configured to determine a similarity score based on a comparison of a face image of a user acquired by the camera with a reference image, determine that a face authentication process is successful based on the similarity score being greater than a threshold, and change the threshold based on a user input for changing the threshold, location information of a smart key, or environment information around the vehicle.

18 Claims, 9 Drawing Sheets

VEHICLE AND METHOD OF CONTROLLING THE SAME

CROSS-REFERENCE TO RELATED APPLICATIONS

This application claims the benefit of Korean Patent Application No. 10-2021-0172870, filed on Dec. 6, 2021, which application is hereby incorporated herein by reference.

TECHNICAL FIELD

The present disclosure relates to a vehicle and a method of controlling the same.

BACKGROUND

Face authentication technology, which is one of multiple biometric authentication technologies, is an authentication technology of determining whether a user is a valid user based on a face displayed in a still image or a moving image.

Recently, with the convenience and efficiency of the face authentication technology, the face authentication technology has been widely used in various application fields, such as a security system, a mobile authentication system, and a vehicle access and ignition system.

However, since the conventional face authentication technology may not flexibly cope with a change in a user's appearance and surrounding environment, authentication failures frequently occur even when the genuine user performs face authentication.

SUMMARY

The present disclosure relates to a vehicle and a method of controlling the same. Particular embodiments relate to a vehicle capable of changing a threshold that is a criterion for face authentication.

Therefore, an embodiment of the disclosure provides a vehicle and a method of the same that are capable of changing a threshold, which is a criterion for face authentication, according to a user's intention.

Another embodiment of the disclosure provides a vehicle and a method of controlling the same that are capable of changing a threshold, which is a criterion for face authentication, according to a surrounding environment of the vehicle.

Embodiments of the disclosure are not limited to the above, and other embodiments may become apparent to those of ordinary skill in the art based on the following descriptions.

According to an embodiment of the disclosure, there is provided a vehicle including a camera configured to acquire a face image of a user and a controller configured to determine a similarity score based on comparing the face image with a reference image and to determine that face authentication is successful based on the similarity score being greater than a threshold, wherein the controller is configured to change the threshold based on at least one of a user input for changing the threshold, location information of a smart key, or environment information around the vehicle.

The vehicle may further include a user interface device configured to receive the user input, wherein the controller may be configured to change the threshold based on receiving the user input.

The vehicle may further include a communication module configured to receive the user input from the smart key, wherein the controller may be configured to change the threshold based on receiving the user input.

The vehicle may further include an illuminance sensor, wherein the controller may be configured to change the threshold based on an illuminance measured by the illuminance sensor.

The controller may be configured to set the threshold to be lower as the illuminance measured by the illuminance sensor increases.

The vehicle may further include a communication module configured to communicate with the smart key, wherein the controller may be configured to change the threshold based on the location information of the smart key received from the communication module.

The controller may be configured to set the threshold to be lower as a distance between the smart key and the vehicle decreases.

The controller may be configured to determine the threshold based on a distance between the smart key and the vehicle and an illuminance around the vehicle.

The controller may be configured to, in response to the distance being smaller than a first reference distance and the illuminance being higher than a first reference illuminance, determine the threshold as a first value, in response to the distance being smaller than the first reference distance and the illuminance being lower than the first reference illuminance, determine the threshold as a second value, and in response to the distance being larger than the first reference distance, determine the threshold as a third value, wherein the first value may be smaller than the second value, and the second value is smaller than the third value.

The vehicle may further include a rain sensor, wherein the controller may be configured to change the threshold based on rain information acquired from the rain sensor.

According to another embodiment of the disclosure, there is provided a method of controlling a vehicle, the method including acquiring a face image of a user, determining a similarity score based on comparing the face image with a reference image, based on the similarity score being greater than a threshold, determining that face authentication is successful, and changing the threshold based on at least one of a user input for changing the threshold, location information of a smart key, or environment information around the vehicle.

The changing of the threshold may include changing the threshold based on receiving the user input through a user interface device.

The changing of the threshold may include changing the threshold based on receiving the user input from the smart key.

The changing of the threshold may include changing the threshold based on an illuminance measured from an illuminance sensor.

The changing of the threshold based on the illuminance may include setting the threshold to be lower as the illuminance measured by the illuminance sensor increases.

The changing of the threshold may include changing the threshold based on the location information of the smart key received from a communication module that communicates with the smart key.

The changing of the threshold based on the location information of the smart key may include setting the threshold to be lower as a distance between the smart key and the vehicle decreases.

The changing of the threshold may include determining the threshold based on a distance between the smart key and the vehicle and an illuminance around the vehicle.

The determining of the threshold based on the distance between the smart key and the vehicle and the illuminance around the vehicle may include, in response to the distance being smaller than a first reference distance and the illuminance being higher than a first reference illuminance, determining the threshold as a first value, in response to the distance being smaller than the first reference distance and the illuminance being lower than the first reference illuminance, determining the threshold as a second value, and in response to the distance being larger than the first reference distance, determining the threshold as a third value, wherein the first value is smaller than the second value, and the second value is smaller than the third value.

The changing of the threshold may include changing the threshold based on rain information acquired from a rain sensor.

BRIEF DESCRIPTION OF THE DRAWINGS

These and/or other aspects of embodiments of the disclosure will become apparent and more readily appreciated from the following description of exemplary embodiments, taken in conjunction with the accompanying drawings, in which.

DETAILED DESCRIPTION OF ILLUSTRATIVE EMBODIMENTS

Figure 1:
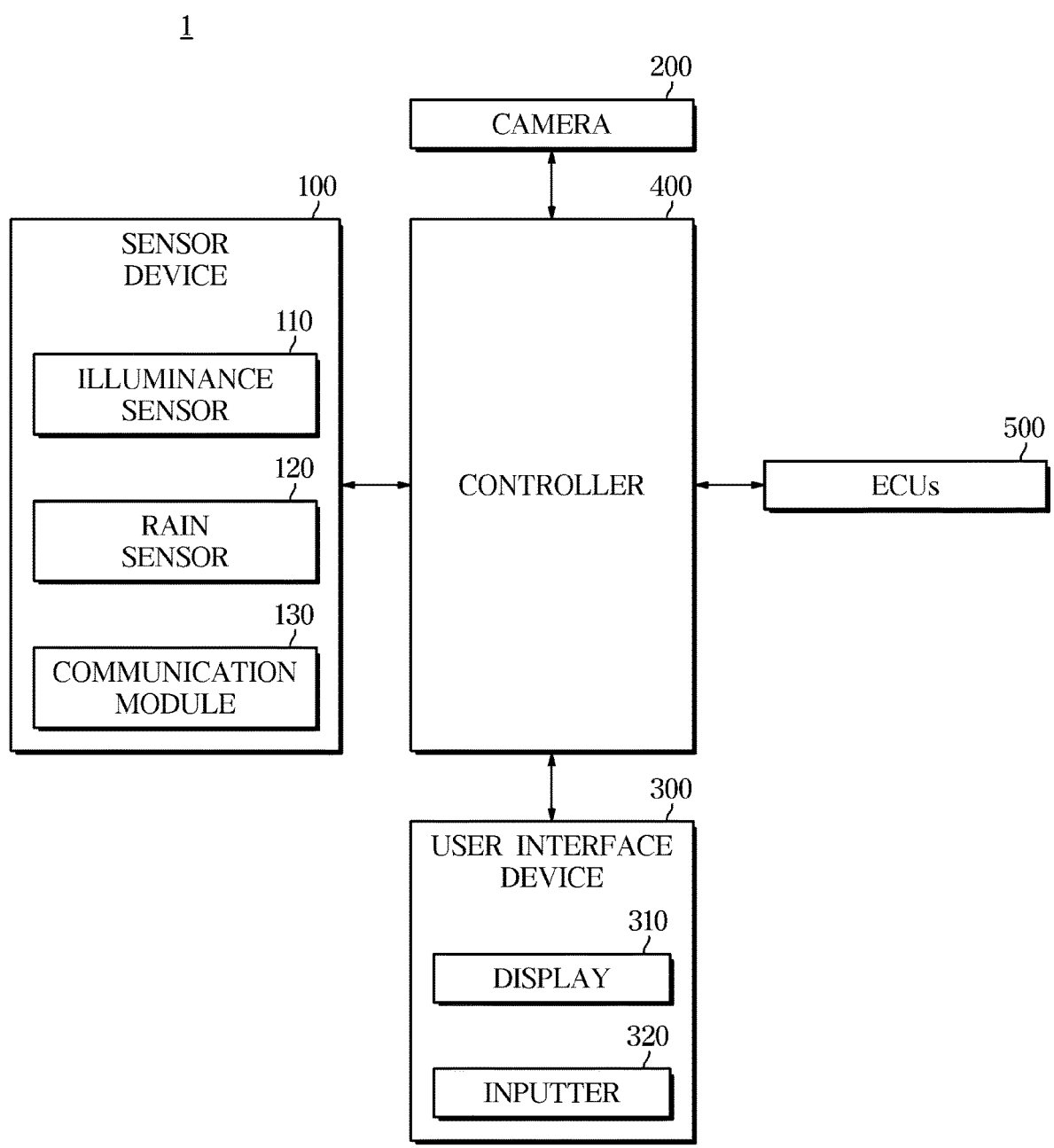
FIG. 1 is a block diagram illustrating a configuration of a vehicle according to an embodiment.

Advantages and features of embodiments and methods of achieving the same will be clearly understood with reference to the accompanying drawings and the following detailed embodiments. However, the present inventive concept is not limited to embodiments described herein, but may be implemented in various different forms. Embodiments are provided in order to explain the present inventive concept for those skilled in the art. The scope of the present inventive concept is defined by the appended claims.

The terms used herein will be briefly described and embodiments will be described in detail.

Although the terms used herein are selected from among general terms that are currently and widely used in consideration of functions in embodiments, these may be changed according to intentions or customs of those skilled in the art or the advent of new technology. In addition, in a specific case, some terms may be arbitrary selected by applicants. In this case, meanings thereof will be described in a corresponding description of embodiments. Therefore, the meanings of terms used herein should be interpreted based on substantial meanings of the terms and content of this entire specification, rather than simply the terms themselves.

Throughout this specification, when a certain part "includes" a certain component, it refers to that another component may be further included not excluding another component unless otherwise defined. Moreover, terms described in the specification such as "part," "module," and "unit," refer to a unit of processing at least one function or operation, and may be implemented by software, a hardware component such as a field-programmable gate array (FPGA) or an application-specific integrated circuit (ASIC), or a combination of software and hardware. However, the terms "part," "module," "unit," and the like are not limited to software or hardware. "Part," "module," "unit," and the like may be configured in a recording medium that may be addressed or may be configured to be reproduced on at least one processor. Therefore, examples of the terms "part," "module," "unit," and the like include software components, object-oriented software components, components such as class components and task components, processes, functions, properties, procedures, subroutines, segments in program codes, drivers, firmware, microcode, circuits, data, databases, data structures, tables, arrays, and variables. The components and the modules may be provided into a smaller number of components and modules such that the respective component and modules may be merged in respect to the functionality.

Hereinafter, with reference to the accompanying drawings, embodiments of a face authentication system, a vehicle including the same, and a face authentication method will be described in detail so that a person skilled in the art may easily implement the disclosure. In addition, parts irrelevant to the description are omitted in the drawings in order to clearly explain embodiments. In the accompanying drawings, parts that are identical or equivalent to each other will be assigned the same reference numerals, and in the following description of the embodiments, details of redundant descriptions thereof will be omitted.

FIG. 1 is a block diagram illustrating a configuration of a vehicle according to an embodiment.

Referring to FIG. 1, a vehicle 1 according to an embodiment includes a sensor device 100, a camera 200, a user interface device 300, a controller 400, and a plurality of electronic control units (ECUs) 500.

The sensor device 100 may include at least one sensor for acquiring environmental information around the vehicle 1.

For example, the sensor device 100 may include an illuminance sensor 110 for detecting an illuminance and/or a rain sensor 120 for detecting rain.

The illuminance sensor 110 may measure the amount of light incident on the vehicle 1 or the amount of light around the vehicle 1, and the amount of light measured by the illuminance sensor 110 may be transmitted to the controller 400.

For example, the illuminance sensor 110 may be provided above the center fascia of the vehicle 1 and installed below the windshield to measure the amount of light transmitted through the windshield, but the location of the illuminance sensor 110 is not limited thereto.

The illuminance sensor 110 may include a variable resistor in which the resistance value changes according to the intensity of light.

The illuminance sensor 110 may be provided as an illuminance sensor used in an auto light system of the vehicle 1, but is not limited thereto.

Although shown separately in the drawings, the illuminance sensor 110 may be a component of the camera 200 according to various embodiments. For example, the camera 200 may include the illuminance sensor 110 for measuring the amount of light, and may automatically adjust an exposure value according to the amount of ambient light. The exposure value may include setting values for shutter speed, aperture, and/or ISO sensitivity. In an embodiment, the camera 200 may lower the exposure value as the surroundings become brighter and may increase the exposure value as the surroundings become darker.

In other words, the illuminance sensor 110 according to an embodiment may be a component of the camera 200, may be a sensor used in an auto light system of the vehicle 1, or may be a separate component.

The rain sensor 120 may acquire rain information by detecting the intensity and amount of rainwater, and the rain information acquired from the rain sensor 120 may be transmitted to the controller 400.

For example, the rain sensor 120 may be provided on the windshield of the vehicle 1, and may detect the amount and speed of rainwater that has fallen on the windshield.

The rain sensor 120 may include an infrared sensor for detecting the amount and speed of rainwater using infrared rays.

The rain sensor 120 may be provided as a rain sensor used in an auto wiper system of the vehicle 1, but is not limited thereto.

Although shown separately in the drawings, the rain sensor 120 according to various embodiments may be implemented as a communication module 130. For example, the communication module 130 may receive weather information at the current location of the vehicle 1 from an external server, and the controller 400 may determine whether it is raining based on the received weather information.

The communication module 130 may include a long-distance communication module and/or a short-distance communication module that exchanges data with an external device (e.g., a server or a user terminal).

For example, the communication module may refer to a communication module capable of performing wireless Internet communication, such as, a wireless LAN (WLAN), a wireless broadband (Wibro), a Wi-Fi, a world interoperability for microwave access (WiMax), and a high-speed downlink packet access (HSDPA).

According to various embodiments, the communication module may include a plurality of ultra-wideband (UWB) modules for exchanging data with an external device (e.g., a smart key) using a UWB signal.

The plurality of UWB modules may include an outdoor UWB module provided outside the vehicle 1 and an indoor UWB module provided inside the vehicle 1.

However, the number and positions of the UWB modules are not limited thereto, and fewer or more UWB modules may be installed in various positions of the vehicle 1 according to the specification or performance of the vehicle 1.

The communication module 130 (e.g., a UWB module) according to an embodiment may include a transmitter and a receiver.

The transmitter of the communication module 130 may transmit a UWB signal for communicating with the smart key of the vehicle 1, and the UWB signal may be a signal generated based on a UWB impulse signal.

The UWB signal transmitted by the transmitter of the communication module 130 may refer to an acknowledgement signal to a UWB signal transmitted from the smart key, and the UWB signal transmitted from the smart key and the acknowledgement signal may include a preset data packet. The smart key may transmit a re-acknowledgement signal in response to the acknowledgement signal transmitted from the UWB module. In this case, the UWB signal transmitted from the smart key may also be a signal generated based on a UWB impulse signal.

In addition, an authentication signal transmitted by the transmitter of the communication module 130 may refer to a search signal (query) for discovering the location of the smart key, and the smart key may, in response to the search signal transmitted from the transmitter of the communication module 130, transmit an acknowledgement signal including a preset data packet.

That is, the transmitter of the communication module 130 may, in response to the receiver of the communication module 130 receiving the UWB signal including the preset data packet from the smart key, transmit the authentication signal, and in this case, the smart key may serve as an initiator and the communication module 130 (e.g., a UWB module) may serve as a responder.

In addition, the transmitter of the communication module 130 may transmit an authentication signal including a preset data packet when a preset condition is satisfied or every preset period, and in this case, the communication module 130 (e.g., an UWB module) may serve as an initiator and the smart key may serve as a responder.

The smart key is a device having a communication module capable of transmitting a UWB signal including a preset data packet corresponding to the vehicle 1, and may include a FOB key of the vehicle 1 and/or a user terminal. The user terminal may include a portable terminal capable of interworking with the vehicle 1 through communication with the vehicle 1 and accessing the vehicle 1 through a network. For example, the user terminal includes all types of handheld-based wireless communication devices, such as smart phones, and wearable devices, such as a watch, a ring, a bracelet, an anklet, a necklace, glasses, contact lenses, or a head-mounted-device (HMD).

The receiver of the communication module 130 may include a reception antenna capable of receiving the UWB signal transmitted from the smart key. For example, the antenna may include a UWB antenna.

The reception antenna of the communication module 130 may receive the UWB signal transmitted from the smart key. As described above, the UWB signal transmitted from the smart key may refer to a signal transmitted from the smart key every preset period, and may refer to a re-acknowledgement signal transmitted from the smart key in response to an authentication signal output from the transmitter of the communication module 130.

The communication module 130 (e.g., a plurality of UWB modules) may acquire location information of the smart key based on the UWB signal received from the smart key.

For example, the location of the smart key may be determined based on various positioning algorithms. Specifically, the location of the smart key may be determined based on a time difference of arrival (TDoA) of the UWB signal received from the smart key, and the location of the smart key may be determined based on a two-way ranging (TWR) method. In addition, the location of the smart key may be identified using various positioning algorithms, such as angle of arrival (AoA), angle of departure (AoD), time of arrival (ToA), and time of flight (ToF). The algorithm for estimating the location is not limited thereto.

According to various embodiments, the communication module 130 may include a Bluetooth™ communication module and/or a Bluetooth low energy communication module (BLE communication module).

The communication module 130 may exchange data with the smart key located in a short distance (e.g., within 10 m) through a Bluetooth communication network.

For example, the communication module 130 may, based on a smart key entering a communicable area, detect that there is a communicable smart key through the Bluetooth communication network.

Specifically, the communication module 130 may transmit a request signal including an advertising packet signal, and the smart key may, in response to receiving the request signal, transmit an acknowledgement signal, and the communication module 130 may detect the smart key based on receiving the acknowledgement signal from the smart key.

The communication module 130 may, in response to the smart key entering the communication area, transmit a pairing request signal, and the smart key receiving the pairing request signal may transmit an acknowledgement signal corresponding to the pairing request signal through the Bluetooth communication network. Based on receiving the acknowledgement signal from the smart key through the Bluetooth communication network, the communication module 130 may be paired with the smart key.

The communication module 130 (e.g., a BLE communication module) may acquire location information of the smart key based on detecting the smart key.

For example, since the BLE communication module may communicate with the smart key only in a short distance (e.g., within 10 m), it may be estimated that the smart key is located at a distance close to the vehicle 1 based on detecting the smart key by the BLE communication module.

In addition, the communication module 130 may indirectly estimate the distance between the smart key and the vehicle 1 based on the communication quality (e.g., communication strength/intensity) with the smart key.

In summary, the location information of the smart key may be acquired through the communication module 130 that communicates with the smart key in various ways, and accordingly, the controller 400 may receive information about the distance between the smart key and the vehicle 1.

The camera 200 may acquire a face image of the user by photographing the face of the user.

The camera 200 may refer to any configuration capable of acquiring a face image of the driver. For example, the camera 200 may employ a complementary metal-oxide semiconductor (CMOS) image sensor or a charge-coupled device (CCD) image sensor.

The camera 200 may be installed at a location in which the user's face is easily photographed. For example, the camera 200 may be provided on an A-pillar and/or a B-Pillar of the driver's side and/or an A-Pillar and/or a B-pillar of the passenger's seat side to photograph a user outside the door and/or a user inside the door.

As described above, the camera 200 may automatically adjust the exposure value according to the amount of ambient light. The exposure value may include setting values for shutter speed, aperture, and/or ISO sensitivity. In an embodiment, the camera 200 may lower the exposure value as the surroundings become brighter and may increase the exposure value as the surroundings become darker.

For example, the camera 200 may set the exposure value to be less than or equal to a preset value in an outdoor space in sunlight, and set the exposure value to be greater than the preset value in an indoor space darker than outdoors.

The camera 200 may operate based on a control signal of the controller 400, and may transmit a face image of a user to the controller 400. In addition, the camera 200 may transmit information about the exposure value to the controller 400.

The user interface device 300 may include a display 310 for displaying various types of information (e.g., a user interface for setting a face authentication) related to a face authentication process and an inputter 320 for receiving various user inputs related to the face authentication process.

The display 310 may include at least one display. The at least one display may be a light emitting diode (LED) panel, an organic light emitting diode (OLED) panel, a liquid crystal display (LCD) panel, and/or an indicator. In addition, the display 310 may include a touch screen.

For example, the display 310 may be a part of a navigation device (AVN device), a heads-up display, and/or a cluster.

The display 310 may display a user interface for registering a reference image serving as a reference for the face authentication process and/or a user interface for changing settings related to the face authentication process.

The inputter 320 may include buttons, dials, and/or touchpads provided at various positions in the vehicle 1.

For example, the inputter 320 may include a push button, a touch button, a touch pad, a touch screen, a dial, a stick-type operation device, and/or a track ball. When the inputter 320 is implemented as a touch screen, the inputter 320 may be provided integrally with the display 310.

The inputter 320 may receive a user input for registering a reference image serving as a reference for the face authentication process and/or a user input for changing settings related to the face authentication process.

The plurality of ECUs 500 may control various electronic components of the vehicle 1, respectively. In one embodiment, the vehicle 1 includes electronic components, such as a speaker, a door lock, an ignition device, a wiper, a power seat, a seat heater, a cluster, a room lamp, a head lamp, a tail lamp, a navigation device, a multi-function switch, a seat control device for driving a seat, and the like.

The plurality of ECUs 500 may include an ECU for controlling opening and closing of doors and/or an ECU for controlling lighting of lamps and/or an ECU for controlling starting of the vehicle 1 and/or an ECU for controlling the seats of the vehicle 1. Each of the plurality of ECUs 500 may perform at least one function related to the vehicle 1.

The controller 400 may perform various functions based on the face image of the user received from the camera 200.

For example, the controller 400 may perform a face authentication process based on the user's face image received from the camera 200. In addition, the controller 400 may move a lens of the camera 200 or rotate the camera 200 based on the user's face image to adjust a field of view of the camera 200.

The controller 400 may include at least one memory in which a program for performing the above-described operations and operations to be described below is stored, and at least one processor for executing the stored program. The controller 400 is electrically connected to the sensor device 100, the camera 200, the user interface device 300 and/or the plurality of ECUs 500 for controlling various components of the vehicle 1, to control various components corresponding to the camera 200, the sensor device 100, the user interface device 300 and/or the plurality of ECUs 500.

When the controller 400 includes a plurality of memories and a plurality of processors, the plurality of memories and the plurality of processors may be integrated into one chip or may be physically separated. In addition, the controller 400 may include an image processor for processing an image acquired from the camera 200.

For example, the controller 400 may perform a face authentication process of authenticating the user by comparing the face image of the user with a reference image stored in the memory.

The reference image is an image registered by a user through a face registration process, and refers to an image that is a reference for face authentication.

In an embodiment, the controller 400 may perform image pre-processing on the face image of the user. The image pre-processing process may include one or more processes of processing the face image of the user to have a form more suitable for face authentication. For example, the image pre-processing process may include a process of removing noise included in the face image of the user, a process of increasing the contrast of the face image of the user, a deblurring process of removing blur included in the face image of the user, a process of removing a background region, a warping process of correcting distortion included in the face image of the user, and a process of binarizing the face image of the user.

The controller 400 detects a face region in the face image of the user. The controller 400 may detect the face region in the face image of the user using, for example, a Haar-based cascade AdaBoost classifier, a neural network-based classifier, or a support vector machine. However, the scope of the embodiment is not limited thereto, and the controller 400 may detect a face region from the face image of the user using various face region detection techniques.

The controller 400 may normalize the detected face region. In an embodiment, the controller 400 may detect facial feature points (facial landmarks) in the detected facial region, and normalize the facial region based on the detected feature points. The controller 400 may detect facial landmarks in the face region, for example, using active contour model (ACM), active shape model (ASM), active appearance model (AAM), supervised descent method (SDM), a feature-point detection technique based on a neural network, or the like. The facial feature points are feature points for major parts of a face, which are provided to identify, for example, the eyebrows, eyes, nose, lips, chin, ears, or contours of a face. Normalization may include, for example, an image cropping process of extracting a facial image representing a face region from the face image of the user, a process of matching the positions of feature points detected in the face region to predefined reference positions, and a process of adjusting the size of the extracted facial image. As an example, the facial image extracted from the face image of the user may have a form of a patch image. The controller 400 may match the positions of the feature points to the reference positions by performing affine transformation based on the detected positions of the feature points. Here, the affine transformation serves to map a vector space represented by the positions of the feature points to another vector space.

The controller 400 may compare facial feature points of the user extracted from the face image of the user with feature points extracted from a reference face image, to compare the face image of the user with the reference face image, and according to a result of the comparison, calculate a similarity score.

That is, the controller 400 may determine the similarity score based on comparing the face image of the user with the reference image.

The similarity score is a score that quantifies the similarity between the facial feature points of the user extracted from the face image of the user and the feature points extracted from the reference face image, and may be calculated based on the similarity of the feature points.

The similarity score may increase as the difference between the feature values of the facial feature points of the user extracted from the face image of the user and the feature values of the feature points extracted from the reference face image becomes smaller, and the similarity score may decrease as the difference becomes larger.

The controller 400 may employ various algorithms to calculate the similarity score between the face image of the user and the reference face image. For example, the controller 400 may execute an algorithm for comparing the feature values of the facial feature points of the user extracted from the face image of the user with the feature values of the feature points extracted from the reference face image.

According to various embodiments, the controller 400 may calculate the similarity score between the face image of the user and the reference image using a learning model trained by machine learning.

The memory of the controller 400 may store various types of information required for performing the face authentication process. The memory of the controller 400 may store a reference image serving as a reference for determining whether the user is genuine.

The user may perform a face registration process to register a reference face image in the memory of the controller 400.

As an example, the controller 400 may control the user interface device 300 to output a user interface (e.g., a guide message) for performing a face registration process, and the user may perform a face registration process through the user interface device 300.

The user may input a reference image through the camera 200 according to the guide provided by the user interface device 300 to store the reference image in the memory.

The memory may store at least one reference image. For example, the memory may store at least one reference image for each of a plurality of users, and may store a plurality of reference images for a single user.

When a plurality of users use the vehicle 1, the controller 400 may specify a user based on a face image of the user, and may perform a face authentication process based on a reference face image related to the specified user.

The sensor device 100, the camera 200, the user interface device 300, the controller 400, and the plurality of ECUs 500 may communicate with each other through a vehicle communication network (NT). For example, the sensor device 100, the camera 200, the user interface device 300, the controller 400, and the plurality of ECUs 500 may exchange data through Ethernet, Media Oriented Systems Transport (MOST), Flexray, Controller Area Network (CAN), and Local Interconnect Network (LIN).

Although various components of the vehicle 1 have been described above, a new configuration may be added or a described configuration may be omitted within the scope of the conventional technology.

Figure 2:
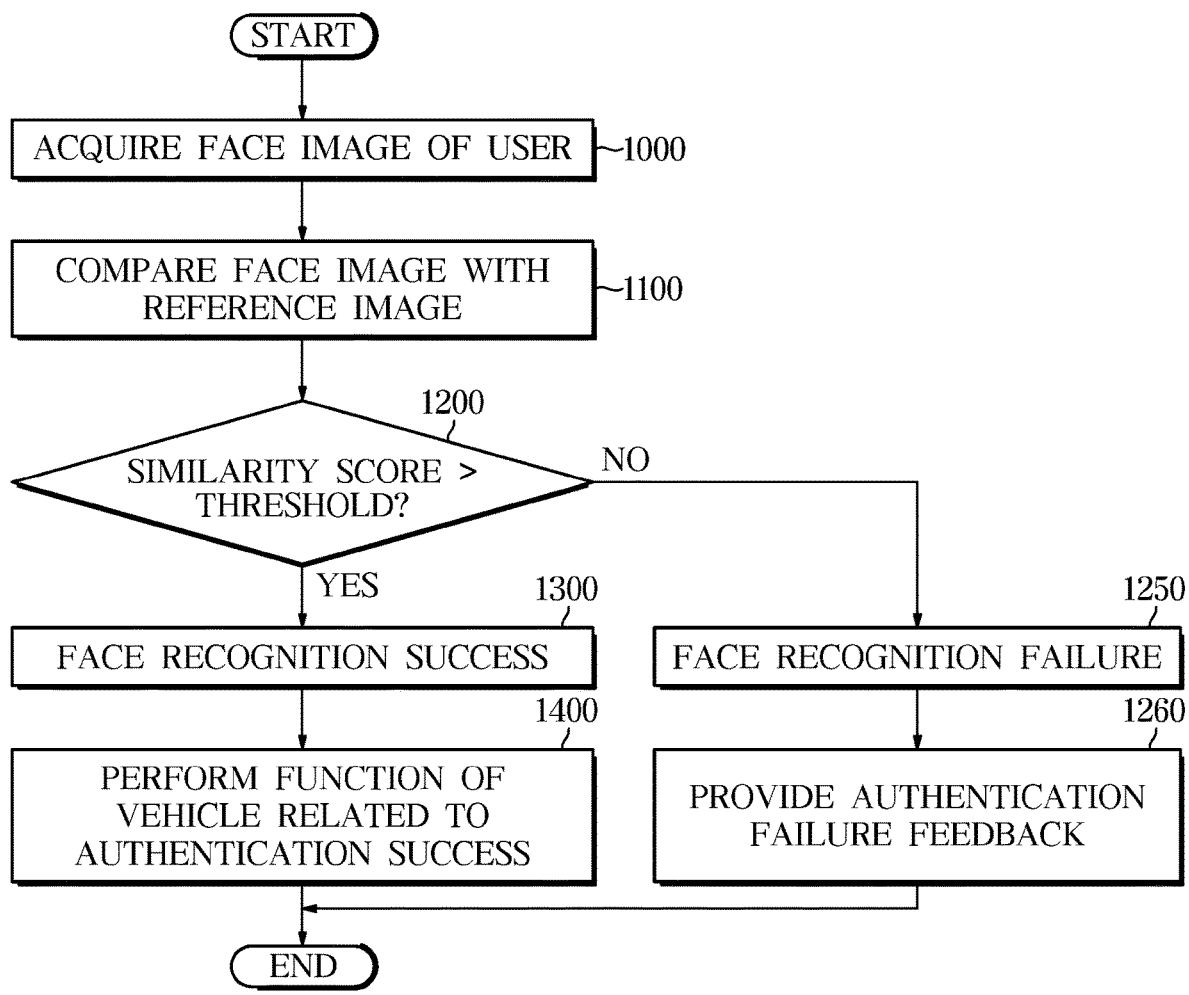
FIG. 2 is a flowchart showing a face authentication process performed by a vehicle according to an embodiment.

FIG. 2 is a flowchart showing a face authentication process performed by a vehicle according to an embodiment.

Referring to FIG. 2, the controller 400 may acquire a face image of the user based on starting a face authentication process (1000). The face image of the user may include the user's face.

According to various embodiments, the controller 400 may start the face authentication process based on a preset condition being satisfied.

As an example, the controller 400 may start the face authentication process based on a touch input received by a touch sensor provided on a door handle of the vehicle 1. As another example, the controller 400 may perform the face authentication process based on an object around the vehicle 1 being detected by a proximity sensor of the vehicle 1. However, the conditions for starting the face authentication process are not limited thereto.

The controller 400 may, in response to the preset condition for starting the face authentication process being satisfied, control the camera 200 to acquire a face image of the user.

In an embodiment, the camera 200 operates only when the preset condition for starting the face authentication process is satisfied, thereby reducing the power consumption.

The controller 400 may, upon determining that the user's face does not face the front or a part of the user's face is not included in the face image of the user as a result of processing the face image of the user, control the user interface device 300 to request the user to retake the image.

The controller 400 may compare the face image of the user with at least one reference image based on the acquisition of the face image of the user (1100). The at least one reference image may refer to a reference image previously stored in the memory of the controller 400.

As described above, the controller 400 may determine the similarity score based on comparing the face image of the user with the at least one reference image.

The controller 400 may determine whether face authentication is successful based on the similarity score between the face image of the user and the at least one reference image.

For example, the controller 400 may determine that the face authentication is successful based on the similarity score between the face image of the user and the reference image being greater than a threshold (Yes in operation 1200) (1300).

In addition, the controller 400 may determine that the face authentication has failed based on the similarity score between the face image of the user and the reference image not being greater than the threshold (No in operation 1200) (1250).

The controller 400 may, based on the face authentication being successful, transmit an authentication success message to the plurality of ECUs 500 to perform functions of the vehicle 1 related to the authentication success (1400).

The plurality of ECUs 500 may control corresponding electronic components to provide feedback indicating to the user that face authentication is successful.

For example, various electrical components (e.g., a lamp and a speaker) of the vehicle 1 may, based on control signals of the plurality of ECUs 500, output a visual indication indicating that the face authentication has been successful or output a sound to the user to notify that the face authentication has been successful.

In addition, the ECU for controlling the door lock may unlock the door of the vehicle 1 based on the face authentication of the user being successful in a state in which the door is locked. As another example, the ECU for controlling the starting device may turn on the ignition based on the face authentication of the user inside the vehicle 1 being successful in a state in which the ignition is turned off.

On the other hand, the controller 400 may, based on the face authentication having failed, transmit an authentication failure message to the plurality of ECUs 500 to perform a function of the vehicle 1 related to the authentication failure (1260).

For example, the plurality of ECUs 500 may, based on receiving the authentication failure message, provide feedback indicating to the user that the face authentication has failed.

For example, various electric components (e.g., a lamp and a speaker) of the vehicle 1 may, based on control signals of the plurality of ECUs 500, output a visual indication indicating that the face authentication has failed or output a sound to the user to notify that the face authentication has failed.

Figure 3:
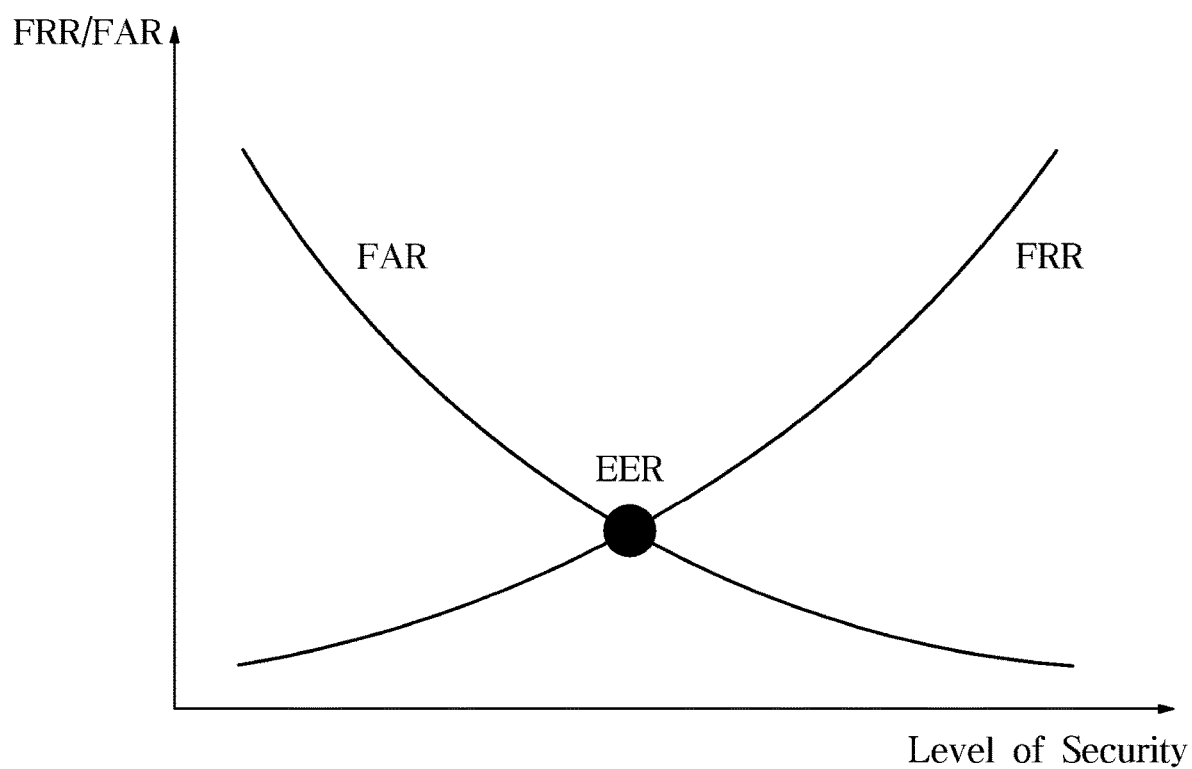
FIG. 3 is a diagram for describing a threshold that is a criterion for face authentication.

FIG. 3 is a diagram for describing a threshold that is a criterion for face authentication.

Referring to FIG. 3, a threshold EER, which is a criterion for face authentication, may be preset based on the other person acceptance rate (a false acceptance rate, FAR) and the self-rejection rate (a false rejection rate, FRR).

The other person acceptance rate is the probability of success when someone other than a genuine user attempts a face authentication, and is a measure of security performance.

The self-rejection rate is the probability of failure when a genuine user attempts a face authentication, and is a measure of usability of face authentication.

In other words, as the threshold (equal error rate, EER) increases, security is strengthened, but the usability of face authentication is lowered. As the threshold EER decreases, the usability of face authentication is improved but security is weakened.

If the other person acceptance rate is too high, security problems arise, and if the self-rejection rate is too high, the usability of face authentication decreases. Accordingly, the threshold EER is determined by the intersection of the self rejection rate graph and the other person acceptance rate graph, that is, the optimum value of the self-rejection rate and the other person acceptance rate.

According to the prior art, the preset optimal threshold EER does not change, so that the usability or security of face authentication may not be changed according to changes in the environment around the vehicle or the intention of the user.

Hereinafter, various embodiments of changing the threshold EER will be described.

Figure 4:
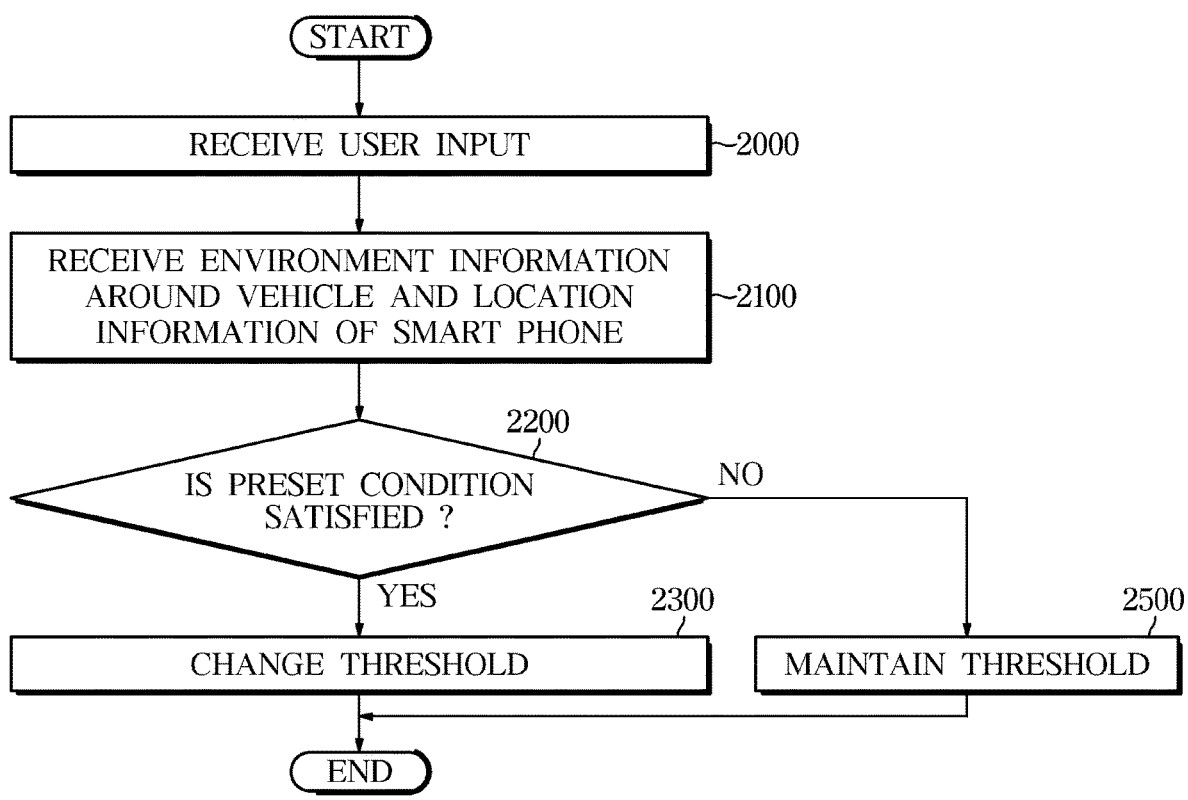
FIG. 4 is a flowchart showing a method of changing a threshold by a vehicle according to an embodiment.

FIG. 4 is a flowchart showing a method of changing a threshold by a vehicle according to an embodiment.

Referring to FIG. 4, the controller 400 according to an embodiment may receive a user input for changing the settings of the face authentication process through the user interface device 300 (2000).

For example, the user may change the setting of the face authentication process through the user interface device 300 from the inside of the vehicle 1, and the controller 400 may receive a user input for changing the setting of the face authentication process.

In addition, the controller 400 may receive environmental information around the vehicle 1 and/or location information of the smart key through the sensor device 100 (2100).

As an example, the controller 400 may receive illumination information around the vehicle 1 from the illumination sensor 11*o*. As another example, the controller 400 may receive rain information around the vehicle 1 from the rain sensor 120. As another example, the controller 400 may receive location information of the smart key from the communication module 130.

The controller 400 may determine whether a preset condition is satisfied based on at least one of the user input for changing the setting of the face authentication process, the location information of the smart key, or the environment information around the vehicle 1 (2200).

The controller 400 may, based on the preset condition related to the at least one of the user input for changing the setting of the face authentication process, the location information of the smart key, or the environment information around the vehicle 1 being satisfied (Yes in operation 2200), change the threshold EER, which is a criterion for face authentication (2300).

For example, the threshold may be classified to correspond to a plurality of security levels, and the controller 400 may change the threshold to a value corresponding to any one of the plurality of security levels according to the satisfied condition.

For example, the controller 400 may increase or decrease the threshold according to the satisfied condition.

In addition, the controller 400 may, based on the preset condition not being satisfied (NO in operation 2200), maintain the threshold EER (2500).

For example, the controller 400 may, based on the preset condition not being satisfied, employ a threshold EER set as a default.

The threshold EER set as a default may be the optimal threshold described in FIG. 3, or may be a threshold set as a default by the user.

Figure 5:
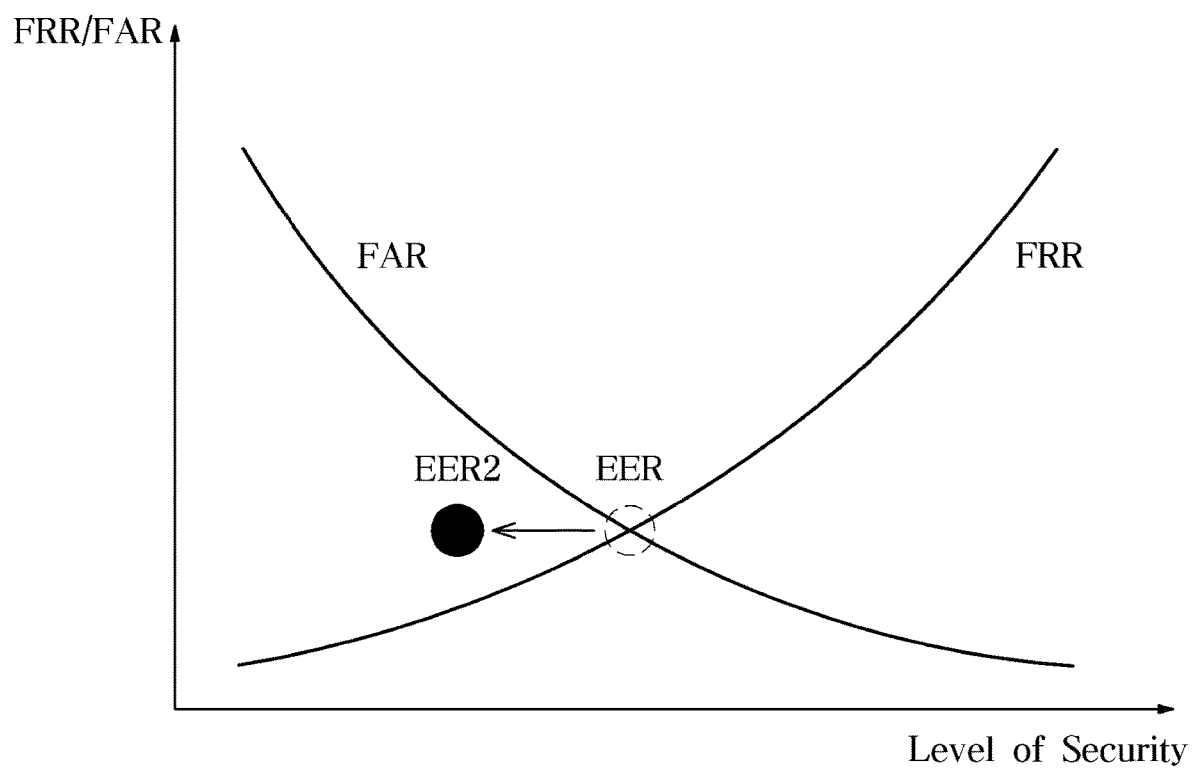
FIG. 5 illustrates a threshold changed to a lower level according to an embodiment.
Figure 6:
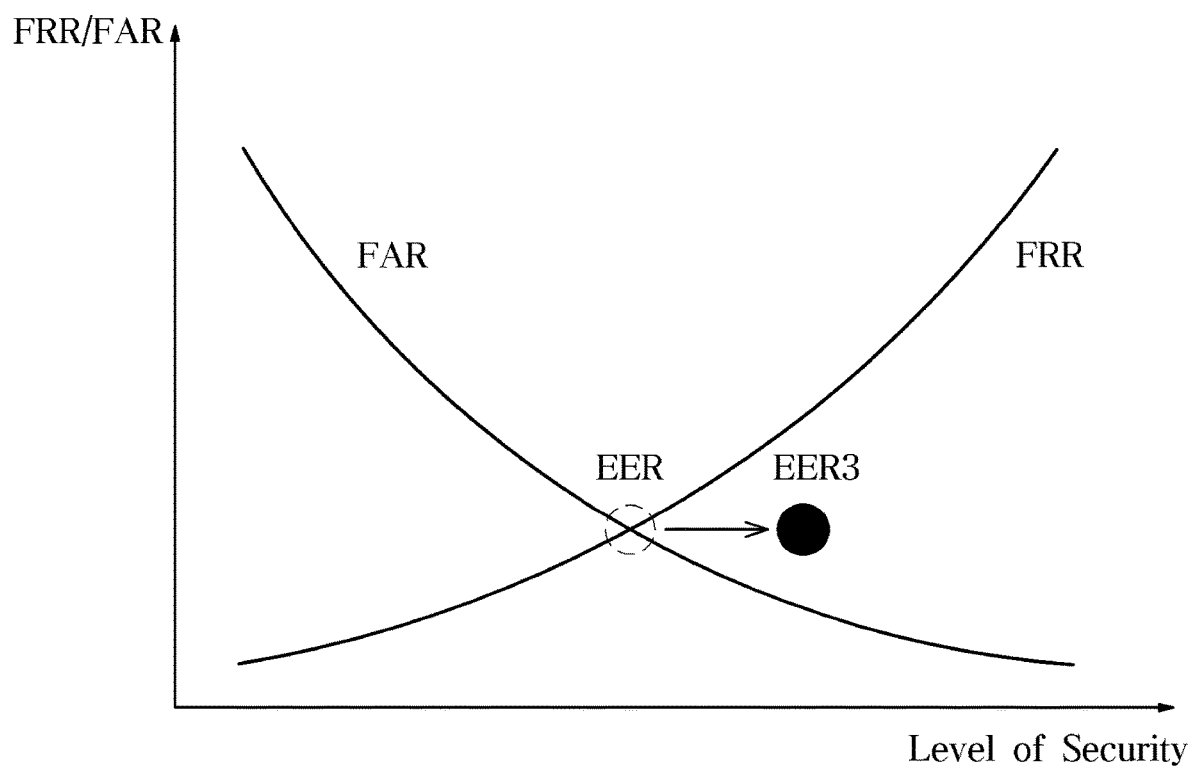
FIG. 6 illustrates a threshold changed to a higher level according to an embodiment.

FIG. 5 illustrates a threshold changed to a lower level according to an embodiment, and FIG. 6 illustrates a threshold changed to a higher level according to an embodiment.

Referring to FIG. 5, it can be seen that the threshold is changed to a first value EER2 lower than the optimal threshold EER. As described above, when the threshold is changed to a lower level, the usability of face authentication is improved, but security may be weakened.

Referring to FIG. 6, it can be seen that the threshold is changed to a second value EER3 higher than the optimum threshold EER. As described above, when the threshold is changed to a higher level, the usability of face authentication is reduced, but security may be enhanced.

Figure 7:
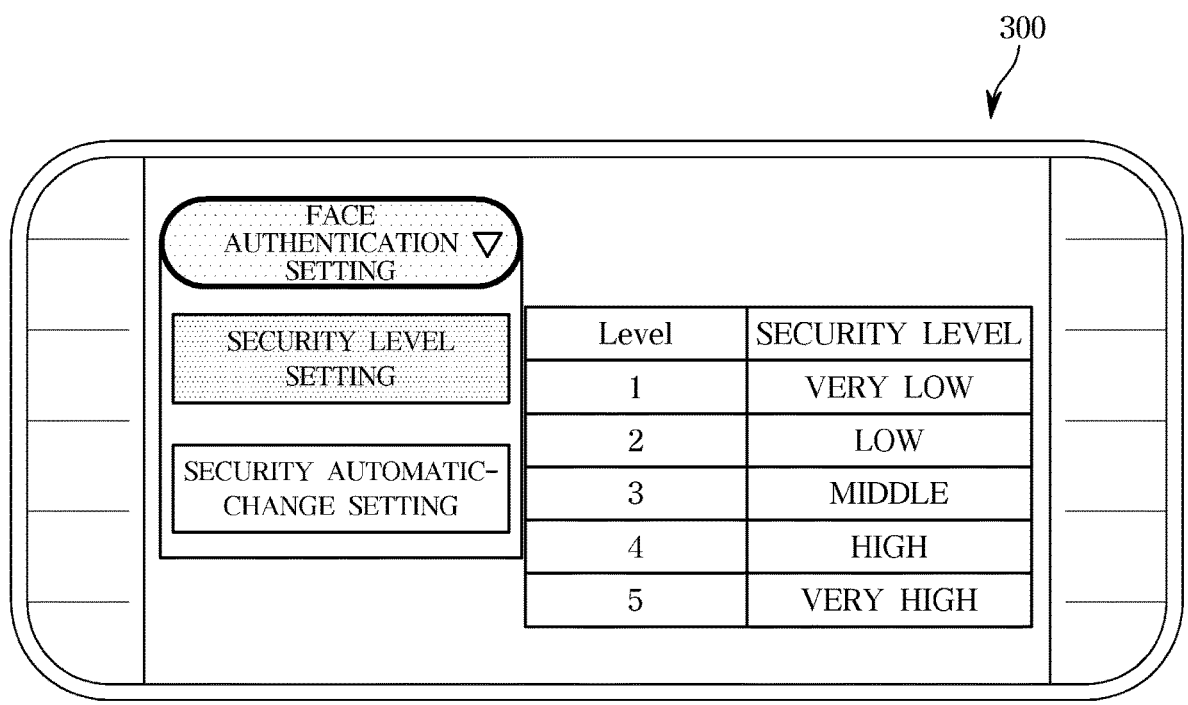
FIG. 7 illustrates an example of a user interface for changing a threshold.

FIG. 7 illustrates an example of a user interface for changing a threshold.

Referring to FIG. 7, the user interface device 300 may provide a user interface for changing settings related to face authentication.

The user interface for changing settings related to face authentication may include a menu for setting a security level of face authentication and/or a menu for turning on/off a function of automatically changing a security level.

The user interface device 300 may, based on the menu for setting the security level being selected by the user, output a plurality of security levels and a visual indication (e.g., text) for explaining the security level according to each security level.

For example, the user may select any one of the plurality of security levels displayed on the user interface device 300 to change the threshold of face authentication.

When the user selects level 1, level 2, level 3, level 4, and/or level 5, the controller 400 may receive a user input for changing the threshold to level 1, level 2, level 3, level 4, and/or level 5 through the user interface device 300.

The controller 400 may change the threshold based on receiving the user input for changing the threshold.

For example, the controller 400 may, based on receiving a user input for changing the threshold to level 1, level 2, level 3, level 4, and/or level 5, change the threshold to level 1, level 2, level 3, level 4, and/or level 5.

According to embodiments of the present disclosure, a user may set the most suitable threshold according to various situations.

As an example, when a user alights from the vehicle for an outdoor activity with all belongings from inside the vehicle, if the user may adjust the threshold to a lower level before leaving the vehicle, a future access to the vehicle may be facilitated even if the user's appearance is changed due to the outdoor activity.

As another example, when the user leaves the vehicle unattended for a long period of time due to a specific reason, if the user adjusts the threshold to a higher level before leaving the vehicle 1, the security of the vehicle may be strengthened.

According to embodiments of the present disclosure, a user's needs may be satisfied by changing the threshold, which is a criterion for face authentication, according to the user's intention.

Figure 8:
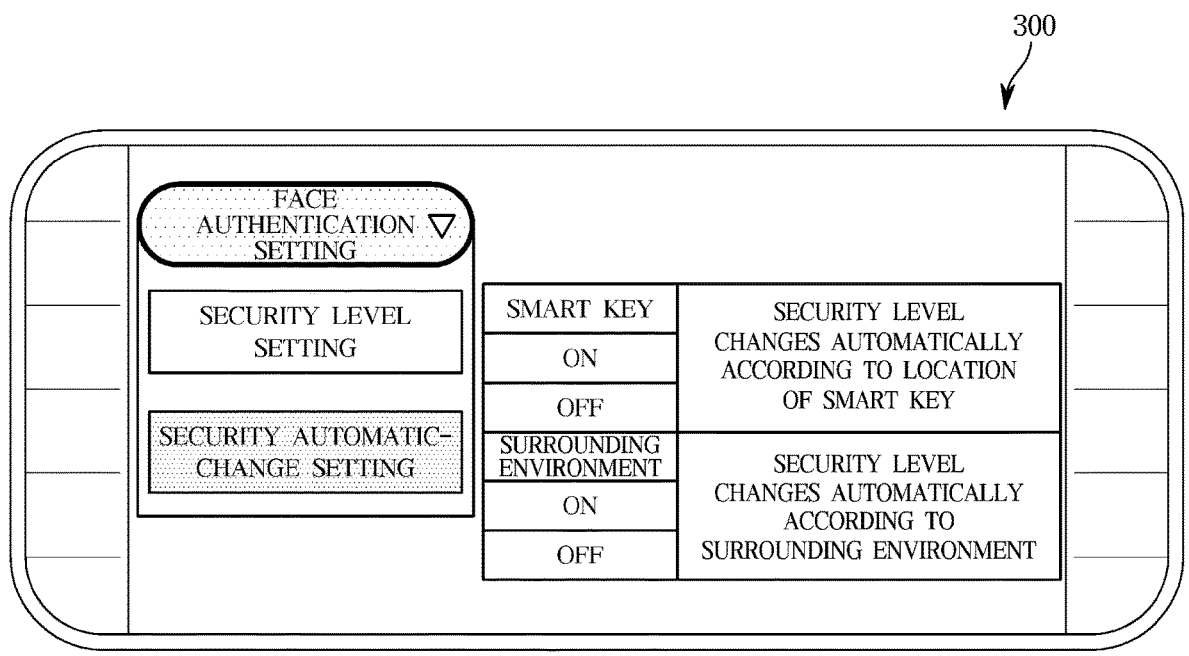
FIG. 8 illustrates an example of a user interface for setting a criterion for changing a threshold.

FIG. 8 illustrates an example of a user interface for setting a criterion for changing a threshold.

Referring to FIG. 8, the user interface device 300 may, based on the menu for turning on/off a function of automatically changing the security level being selected by the user, display an object (e.g., a smart key and/or surrounding environment) that provides a condition for automatically changing the security level, and a button for selecting whether to turn on/off a function of automatically changing the security level according to each object.

For example, the user interface device 300 may display a button for turning on/off a function of automatically changing the security level according to the location of the smart key and/or a button for turning on/off a function of automatically changing the security level according to the surrounding environment.

The controller 400 may, in response to the function of automatically changing the security level according to the location of the smart key being turned on, change the threshold based on the location information of the smart key.

The controller 400 may, in response to the function of automatically changing the security level according to the surrounding environment being turned on, change the threshold based on the surrounding environment information.

In FIG. 8 above, an embodiment in which the function of automatically changing the security level is turned on/off according to the user's setting has been described. However, according to various embodiments, the security level may be automatically changed according to the location of the smart key and/or the surrounding environment without the user's setting.

Figure 9:
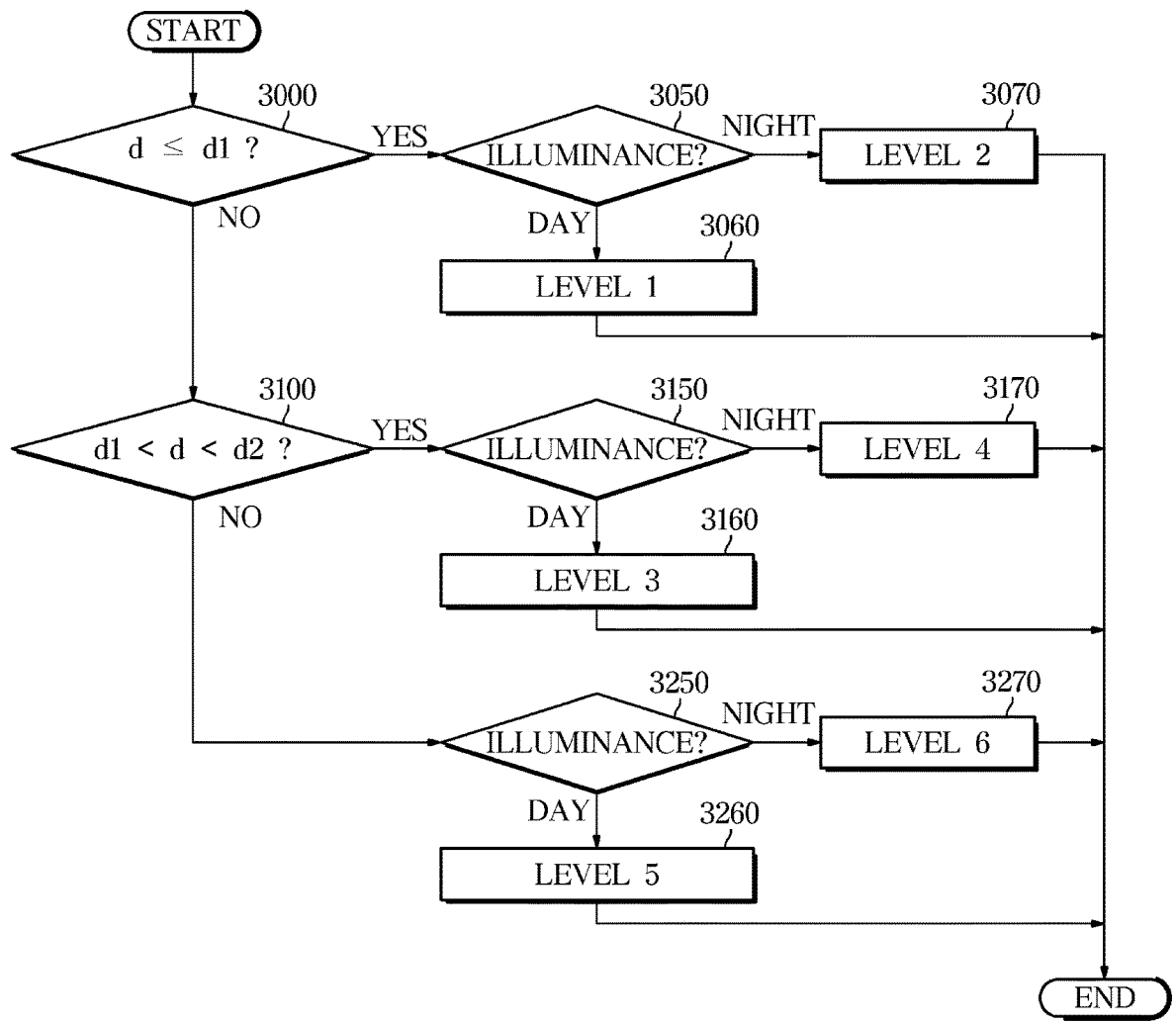
FIG. 9 is a flowchart showing an example in which a vehicle automatically changes a threshold according to an embodiment.

FIG. 9 is a flowchart showing an example in which a vehicle automatically changes a threshold according to an embodiment.

Referring to FIG. 9, the controller 400 may change the threshold based on location information of the smart key and/or illumination information acquired from the illumination sensor 110.

According to various embodiments, the controller 400 may change the threshold based only on the location information of the smart key, or may change the threshold based only on the illuminance information.

For example, the controller 400 may set the threshold to be lower as the distance between the smart key and the vehicle 1 decreases, and may set the threshold to be higher as the distance between the smart key and the vehicle 1 increases.

When a genuine user with a smart key is close to the vehicle 1, even if another person attempts face authentication, the genuine user may quickly respond to the situation, so that usability rather than security needs to be ensured.

According to embodiments of the present disclosure, when the genuine user holding the smart key is close to the vehicle 1, the usability of face authentication is enhanced to thereby provide the user with convenience of use.

According to various embodiments, the controller 400 may, in response to the distance between the smart key and the vehicle 1 being smaller than a first preset distance (e.g., 1 m), set the threshold to level 1, and in response to the distance between the smart key and the vehicle 1 being larger than the first preset distance and smaller than a second preset distance (e.g., 10 m), set the threshold to level 2, and in response to the distance between the smart key and the vehicle 1 being larger than the second preset distance, set the threshold to level 5.

In addition, the controller 400 may set the threshold to be lower as the illuminance measured from the illuminance sensor 110 increases, and may set the threshold to be higher as the illuminance measured from the illuminance sensor 110 decreases.

When direct sunlight enters the camera 200, face authentications fail frequently even when a genuine user attempts the face authentication.

According to embodiments of the present disclosure, when noise is introduced into the camera 200 due to direct sunlight and the face recognition performance is deteriorated, the usability of face authentication is enhanced to thereby provide the user with a convenience of use.

According to various embodiments, the controller 400 may, in response to the illuminance around the vehicle 1 being higher than a preset illuminance, set the threshold to level 2, and in response to the illuminance around the vehicle 1 being lower than the preset illuminance, set the threshold to level 4.

The controller 400 may determine the environment around the vehicle 1 as a daytime state when the illuminance is higher than the preset illuminance, and determine the environment around the vehicle 1 as a nighttime state when the illuminance is lower than the preset illuminance.

In addition, the controller 400 may change the threshold based on rain information acquired from the rain sensor 120.

For example, the controller 400 may set the threshold to be lower as the amount of rainwater increases, and may set the threshold to be higher as the amount of rainwater decreases.

According to embodiments of the present disclosure, when rainy weather causes noise to be introduced into the camera 200 or a change in the user's appearance and then the face recognition performance is deteriorated, the usability of the face authentication is enhanced to thereby provide the user with convenience of use.

Meanwhile, referring again to FIG. 9, the controller 400 may change the threshold by combining the illuminance information and the location information of the smart key.

The controller 400 may, in response to the distance d between the smart key and the vehicle 1 being smaller than the first reference distance d1 (e.g., 1 m) (YES in operation 3000) and the illuminance being lower than the preset illuminance (daytime in operation 3050), determine the threshold as a first value corresponding to level 1 (3060).

In addition, the controller 400 may, in response to the distance d between the smart key and the vehicle 1 being smaller than the first reference distance d1 (e.g., 1 m) (YES in operation 3000) and the illuminance being lower than the preset illuminance (nighttime in operation 3050) determine the threshold as a second value corresponding to level 2 (3070).

According to embodiments of the present disclosure, a selection range of thresholds may be determined based on the distance between the smart key and the vehicle 1 first, and then the threshold may be selected based on the illuminance around the vehicle 1 within the determined selection range.

That is, when a genuine user with a smart key is close to the vehicle, it is estimated that security is not significantly required, so the selection range of thresholds may be determined as a range with low security levels.

Similarly, when the distance d between the smart key and the vehicle 1 is larger than the first reference distance d1 (e.g., 1 m) and smaller than the second reference distance d2 (e.g., 10 m) (YES in operation 3100) and the illuminance is higher than the preset illuminance (daytime in operation 3150), the controller 400 may determine the threshold as a third value corresponding to level 3 (3160).

In addition, when the distance d between the smart key and the vehicle 1 is larger than the first reference distance d1 (e.g., 1 m) and smaller than the second reference distance d2 (e.g., 10 m) (YES in operation 3100) and the illuminance is lower than the preset illuminance (nighttime in operation 3150), the controller 400 may determine the threshold as a fourth value corresponding to level 4 (3170).

According to various embodiments, when the distance d between the smart key and the vehicle 1 is larger than the first reference distance d1 (e.g., 1 m) and smaller than the second reference distance d2 (e.g., 10 m) (YES in operation 3100), the controller 400 may determine the threshold as a third value corresponding to level 3 regardless of the illuminance.

According to embodiments of the present disclosure, when a genuine user possessing a smart key exists within a certain range of the vehicle, an optimal threshold may be maintained regardless of the illuminance so that the face authentication function may be optimized.

According to various embodiments, the controller 400 may, in response to the distance d between the smart key and the vehicle 1 being larger than the second reference distance d2 (e.g., 10 m) (No in operation 3100) and the illuminance being higher than the preset illuminance (daytime in operation 3250), determine the threshold as a fifth value corresponding to level 5 (3260).

In addition, the controller 400 may, in response to the distance d between the smart key and the vehicle 1 being larger than the second reference distance d2 (e.g., 10 m) (No in operation 3100) and the illuminance being lower than the preset illuminance (nighttime in operation 3250) determine the threshold as a sixth value corresponding to level 6 (3270).

The first value, the second value, the third value, the fourth value, the fifth value, and the sixth value described with reference to FIG. 9 refer to values ascending in the order.

According to embodiments of the present disclosure, the threshold that is the criterion for face authentication is changed not only according to the user's intention, but also according to the environment around the vehicle 1 flexibly, so that the usability of face authentication may be ensured while improving the security.

Some of the components of the vehicle 1 may refer to a software component and/or a hardware component, such as a Field Programmable Gate Array (FPGA) and an Application Specific Integrated Circuit (ASIC).

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

As is apparent from the above, the threshold, which is a criterion for face authentication, can be changed by a user according to a situation such that when a higher level of security is required, the security is increased and when a lower level of security is required, the success rate of face authentication is increased.

According to embodiments of the present disclosure, the threshold can be automatically changed based on surrounding environmental information of the vehicle such that when a higher level of security is required, the security is increased and when a lower level of security is required, the success rate of face authentication is increased without a manipulation of the user.

Although embodiments of the present disclosure have been described for illustrative purposes, those skilled in the art will appreciate that various modifications, additions and substitutions are possible, without departing from the scope and spirit of the disclosure. Therefore, embodiments of the present disclosure have not been described for limiting purposes.

What is claimed is:

1. A vehicle comprising:
   a camera;
   a user interface device configured to:
   display a first menu for allowing a user to manually set a security level and a second menu for turning on/off a function of automatically changing the security level;
   in response to the first menu being selected, display a plurality of security levels for face authentication and a security degree corresponding to each security level; and
   in response to the second menu being selected:
      display objects that serve as conditions for automatically changing the security level, the objects including location information of a smart key and environment information around the vehicle, and
      display buttons for selecting whether to turn on/off the function of automatically changing the security level for each of a smart key location and surrounding environment; and
   a controller configured to:
      determine a similarity score based on a comparison of a face image of the user acquired by the camera with a reference image;
      determine that the face authentication is successful based on the similarity score being greater than a threshold; and
      in response to the user selecting the first menu and selecting one of the displayed plurality of security levels, change the threshold based on the selected security level; and
      in response to the user selecting the second menu and turning on the function for both the location information of the smart key and the environment information, automatically change the threshold based on the location information of the smart key and the environment information.

2. The vehicle of claim 1, further comprising a communication device configured to receive a user input from the smart key.

3. The vehicle of claim 1, further comprising an illuminance sensor, wherein the controller is configured to change the threshold based on an illuminance measured by the illuminance sensor.

4. The vehicle of claim 3, wherein the controller is configured to set the threshold to be lower as the illuminance measured by the illuminance sensor increases.

5. The vehicle of claim 1, further comprising a communication device configured to communicate with the smart key, wherein the controller is configured to change the threshold based on the location information of the smart key received from the communication device.

6. The vehicle of claim 5, wherein the controller is configured to set the threshold to be lower as a distance between the smart key and the vehicle decreases.

7. The vehicle of claim 1, wherein the controller is configured to determine the threshold based on a distance between the smart key and the vehicle and an illuminance around the vehicle.

8. The vehicle of claim 7, wherein the controller is configured to:
   determine the threshold as a first value in response to the distance being smaller than a first reference distance and the illuminance being higher than a first reference illuminance;
   determine the threshold as a second value greater than the first value in response to the distance being smaller than the first reference distance and the illuminance being lower than the first reference illuminance; and
   determine the threshold as a third value greater than the second value in response to the distance being larger than the first reference distance.

9. The vehicle of claim 1, further comprising a rain sensor, wherein the controller is configured to change the threshold based on rain information acquired from the rain sensor.

10. A method of controlling a vehicle, the method comprising:
    acquiring a face image of a user;
    determining a similarity score based on a comparison of the face image with a reference image;
    determining that a face authentication is successful based on the similarity score being greater than a threshold; and
    changing the threshold based on a user input received through a user interface device, the received user input comprising a security level for face authentication selected by the user;
    displaying, by the user interface device, a first menu for allowing the user to manually set the security level and a second menu for turning on/off a function of automatically changing the security level;
    in response to the first menu being selected, displaying, by the user interface device, a plurality of security levels for the face authentication and a security degree corresponding to each security level; and in response to the second menu being selected:
- displaying, by the user interface device, objects that serve as conditions for automatically changing the security level, the objects including location information of a smart key and environment information around the vehicle, and
- displaying, by the user interface device, buttons for selecting whether to turn on/off the function of automatically changing the security level for each of a smart key location and surrounding environment, wherein changing the threshold includes:
- in response to the user selecting the first menu and selecting one of the displayed plurality of security levels, changing the threshold based on the selected security level; and
- in response to the user selecting the second menu and turning on the function for both the location information of the smart key and the environment information, automatically changing the threshold based on the location information of the smart key and the environment information.

11. The method of claim 10, wherein changing the threshold comprises changing the threshold based on receiving the user input from the smart key.

12. The method of claim 10, wherein changing the threshold comprises changing the threshold based on an illuminance measured from an illuminance sensor.

13. The method of claim 12, wherein changing the threshold based on the illuminance comprises setting the threshold to be lower as the illuminance measured by the illuminance sensor increases.

14. The method of claim 10, wherein changing the threshold comprises changing the threshold based on the location information of the smart key received from a communication module that communicates with the smart key.

15. The method of claim 14, wherein changing the threshold based on the location information of the smart key comprises setting the threshold to be lower as a distance between the smart key and the vehicle decreases.

16. The method of claim 10, wherein changing the threshold comprises determining the threshold based on a distance between the smart key and the vehicle and an illuminance around the vehicle.

17. The method of claim 16, wherein determining the threshold based on the distance between the smart key and the vehicle and the illuminance around the vehicle comprises:
- determining the threshold as a first value in response to the distance being smaller than a first reference distance and the illuminance being higher than a first reference illuminance;
- determining the threshold as a second value greater than the first value in response to the distance being smaller than the first reference distance and the illuminance being lower than the first reference illuminance; and
- determining the threshold as a third value greater than the second value in response to the distance being larger than the first reference distance.

18. The method of claim 10, wherein changing the threshold comprises changing the threshold based on rain information acquired from a rain sensor.

* * * * *